(12) United States Patent
Sugae et al.

(10) Patent No.: US 11,698,456 B2
(45) Date of Patent: Jul. 11, 2023

(54) OBJECT DETECTION SYSTEM (71) Applicant: AISIN CORPORATION, Kariya (JP)

(72) Inventors: Ippei Sugae, Kariya (JP); Koichi Sassa, Kariya (JP)

(73) Assignee: AISIN CORPORATION, Kariya (JP)

( * ) Notice: Subject to any disclaimer, the term of this patent is extended or adjusted under 35 U.S.C. 154(b) by 99 days.

(21) Appl. No.: 17/199,785

(22) Filed: Mar. 12, 2021

(65) Prior Publication Data
US 2021/0302573 A1 Sep. 30, 2021

(30) Foreign Application Priority Data

Mar. 30, 2020 (JP) .................. 2020-061345

(51) Int. Cl.
*G01S 15/10* (2006.01)
*G01S 15/931* (2020.01)
*B60W 30/06* (2006.01)
*B60R 16/023* (2006.01)

(52) U.S. Cl.
CPC .......... *G01S 15/10* (2013.01); *B60R 16/0231* (2013.01); *G01S 15/931* (2013.01); *B60W 30/06* (2013.01); *B60W 2420/54* (2013.01); *G01S 2015/938* (2013.01)

(58) Field of Classification Search
CPC ... G01S 15/08; G01S 15/931; G01S 2015/938
See application file for complete search history.

(56) References Cited

U.S. PATENT DOCUMENTS

| 4,884,192 | A  | * | 11/1989 | Terada  | G06F 15/8015 709/251 |
| 6,628,227 | B1 | * | 9/2003  | Rao     | G01S 15/876 342/70 |
| 6,680,689 | B1 | * | 1/2004  | Zoratti | B60Q 9/008 340/436 |
| 7,545,956 | B2 | * | 6/2009  | Miyahara | G01S 15/86 382/106 |
| 9,542,845 | B1 | * | 1/2017  | Mayer   | G01S 13/931 |
| 9,616,814 | B1 | * | 4/2017  | Chiang  | G01S 15/931 |
| 9,734,744 | B1 | * | 8/2017  | McGie   | G08G 1/096741 |
| 9,791,557 | B1 | * | 10/2017 | Wyrwas  | G01S 7/497 |
| 9,824,337 | B1 | * | 11/2017 | Rodoni  | G06Q 10/30 |
| 2014/0240167 | A1 | * | 8/2014 | Cho    | G08G 1/052 342/104 |

(Continued)

FOREIGN PATENT DOCUMENTS

JP 2018-179782 A 11/2018

*Primary Examiner* — Daniel L Murphy
*Assistant Examiner* — Amie M Ndure
(74) *Attorney, Agent, or Firm* — Sughrue Mion, PLLC (57) ABSTRACT

An object detection system includes: a transmission unit configured to sequentially transmit a plurality of transmission waves to which identification information different from one another is applied; a reception unit configured to sequentially receive a plurality of reception waves respectively corresponding to the plurality of transmission waves returned in response to reflection by an object after all the plurality of transmission waves are transmitted by the transmission unit; and a detection processing unit configured to detect information related to the object based on a relationship between the plurality of transmission waves and the plurality of reception waves.

7 Claims, 6 Drawing Sheets (56) References Cited

U.S. PATENT DOCUMENTS

| | | | | |
|---|---|---|---|---|
| 2017/0028986 A1* | 2/2017 | Kuroda | .................... | G01S 17/86 |
| 2017/0153329 A1* | 6/2017 | Kodama | ................. | G01S 17/42 |
| 2018/0067207 A1* | 3/2018 | Bang | ..................... | G01S 15/102 |
| 2020/0238993 A1* | 7/2020 | Urano | ................... | G05D 1/0061 |
| 2021/0055401 A1* | 2/2021 | Takayama | ............. | G01S 7/4056 |
| 2021/0163014 A1* | 6/2021 | Kimura | ................. | B60W 50/14 |
| 2021/0165012 A1* | 6/2021 | Kimura | ..................... | G01P 3/44 |
| 2021/0221401 A1* | 7/2021 | Komori | ................. | B60W 30/16 |

* cited by examiner

OBJECT DETECTION SYSTEM

CROSS REFERENCE TO RELATED APPLICATIONS

This application is based on and claims priority under 35 U.S.C. § 119 to Japanese Patent Application 2020-061345, filed on Mar. 30, 2020, the entire content of which is incorporated herein by reference.

TECHNICAL FIELD

This disclosure relates to an object detection system.

BACKGROUND DISCUSSION

In the related art, there is known a technique of detecting, by an ultrasonic sensor, information related to an object, such as a distance to the object, by transmitting a transmission wave and receiving a reception wave which is the transmission wave reflected and returned by the object.

An example of the related art includes JP 2018-179782A (Reference 1).

In the technique of the related art as described above, a certain period of time required for a transmission wave to return in response to reflection on an object is required between a timing at which transmission of the transmission wave is completed and a timing at which reception of a reception wave is started. For this reason, when detection of information related to the object is continuously executed a plurality of times, it is necessary to repeatedly execute a series of processes in which a reception wave is received after waiting for a certain period of time after a transmission wave is transmitted.

Therefore, in the technique of the related art as described above, it tends to take a long time to complete the process of continuously executing the detection of information related to the object a plurality of times. However, it is desirable to execute such a process in a shorter time.

A need thus exists for an object detection system which is not susceptible to the drawback mentioned above.

SUMMARY

An object detection system as an example of the present disclosure includes: a transmission unit configured to sequentially transmit a plurality of transmission waves to which identification information different from one another is applied; a reception unit configured to sequentially receive a plurality of reception waves respectively corresponding to the plurality of transmission waves returned in response to reflection by an object after all the plurality of transmission waves are transmitted by the transmission unit; and a detection processing unit configured to detect information related to the object based on a relationship between the plurality of transmission waves and the plurality of reception waves.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments and modifications disclosed here will be described with reference to the drawings. Configurations of the embodiments and the modifications to be described below and actions and effects obtained by the configurations are merely examples, and are not limited to the following description.

Embodiment

Figure 1:
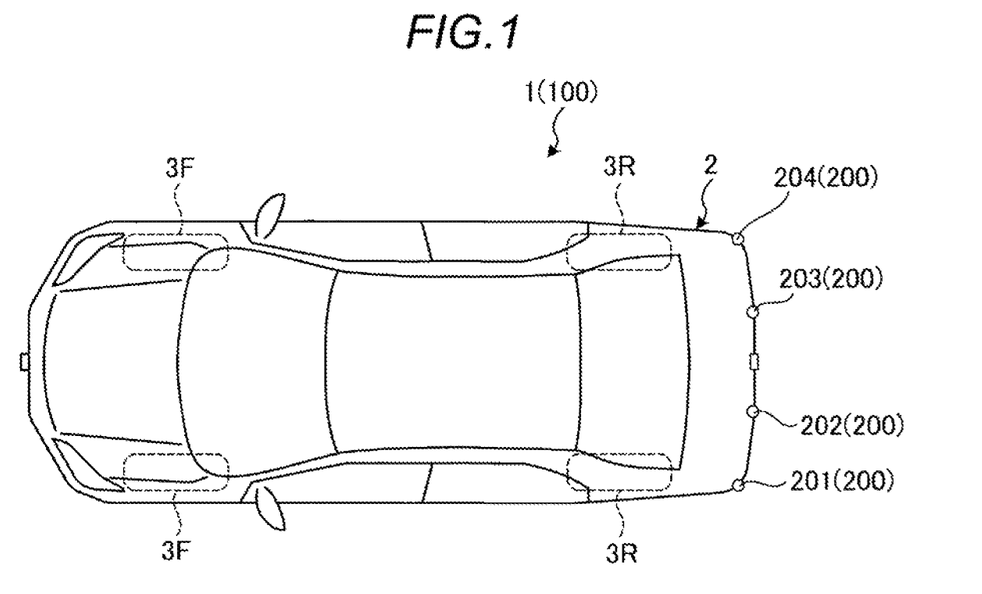
FIG. 1 is an exemplary and schematic view showing an appearance of a vehicle including an object detection system according to an embodiment as viewed from above.

FIG. 1 is an exemplary and schematic view showing an appearance of a vehicle 1 including an object detection system according to an embodiment as viewed from above.

As described to be below, the object detection system according to the embodiment is an in-vehicle sensor system that detects information related to an object (for example, an obstacle O shown in FIG. 2 to be described later) including a person existing in surroundings by performing transmission and reception of an ultrasonic wave and acquiring a time difference between the transmission and reception, and the like.

More specifically, as shown in FIG. 1, the object detection system according to the embodiment includes an electronic control unit (ECU) 100 as an in-vehicle control device and distance detection devices 201 to 204 as in-vehicle sonars. The ECU 100 is mounted inside a four-wheel vehicle 1 including a pair of front wheels 3F and a pair of rear wheels 3R, and the distance detection devices 201 to 204 are mounted on an exterior of the vehicle 1.

In an example shown in FIG. 1, as an example, the distance detection devices 201 to 204 are installed at different positions in a rear end portion (rear bumper) of a vehicle body 2 as the exterior of the vehicle 1, but installation positions of the distance detection devices 201 to 204 are not limited to the example shown in FIG. 1. For example, the distance detection devices 201 to 204 may be installed at a front end portion (front bumper) of the vehicle body 2, may be installed at a side surface portion of the vehicle body 2, or may be installed at two or more of the rear end portion, the front end portion, and the side surface portion.

In the embodiment, hardware configurations and functions of the distance detection devices 201 to 204 are the same as one another. Therefore, in the following description, the distance detection devices 201 to 204 may be collectively referred to as a distance detection device 200 for the sake of simplicity. In the embodiment, the number of distance detection devices 200 is not limited to four as shown in FIG. 1.

Figure 2:
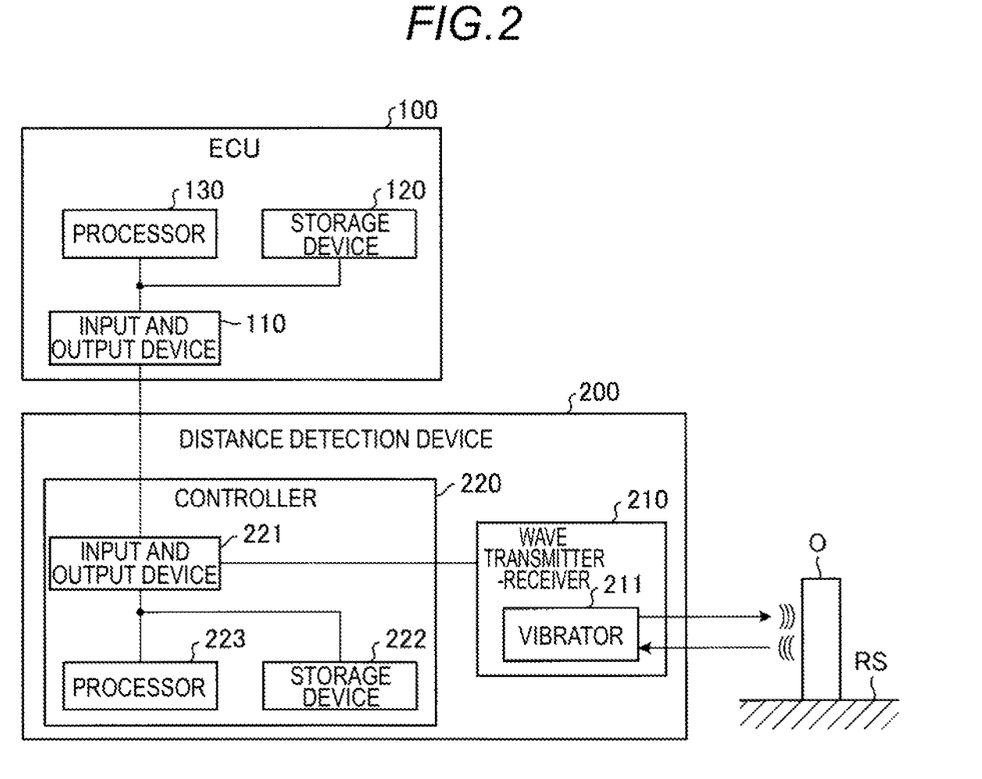
FIG. 2 is an exemplary and schematic block diagram showing schematic hardware configurations of an electronic control unit (ECU) and a distance detection device according to the embodiment.

FIG. 2 is an exemplary and schematic block diagram showing a schematic hardware configuration of the ECU 100 and the distance detection device 200 according to the embodiment.

As shown in FIG. 2, the ECU 100 includes a hardware configuration similar to that of a normal computer. More specifically, the ECU 100 includes an input and output device 110, a storage device 120, and a processor 130.

The input and output device 110 is an interface for implementing transmission and reception of information between the ECU 100 and an outside (the distance detection device 200 in the example shown in FIG. 1).

The storage device 120 includes a main storage device such as a read only memory (ROM) or a random access memory (RAM), and an auxiliary storage device such as a hard disk drive (HDD) or a solid state drive (SSD).

The processor 130 controls various processes to be executed by the ECU 100. The processor 130 includes, for example, an arithmetic device such as a central processing unit (CPU). The processor 130 implements, for example, various functions such as automatic parking by reading and executing a computer program stored in the storage device 120.

On the other hand, as shown in FIG. 2, the distance detection device 200 includes a wave transmitter-receiver 210 and a controller 220. The wave transmitter-receiver 210 is an example of a "transmission and reception unit".

The wave transmitter-receiver 210 includes a vibrator 211 configured with a piezoelectric element or the like, and the vibrator 211 transmits and receives an ultrasonic wave.

More specifically, the wave transmitter-receiver 210 transmits, as a transmission wave, an ultrasonic wave generated in response to vibration of the vibrator 211, and receives, as a reception wave, vibration of the vibrator 211 caused by the ultrasonic wave transmitted as the transmission wave being reflected and returned by an object existing outside. In an example shown in FIG. 2, the obstacle O installed on a road surface RS is shown as an object that reflects the ultrasonic wave from the wave transmitter-receiver 210.

In the example shown in FIG. 2, a configuration is shown in which both transmission of a transmission wave and reception of a reception wave are implemented by the single wave transmitter-receiver 210 including the single vibrator 211. However, a technique of the embodiment is also applicable to, for example, a configuration in which a configuration on a transmission side and a configuration on a reception side are separated, such as a configuration in which a first vibrator for transmitting a transmission wave and a second vibrator for receiving a reception wave are separately provided.

The controller 220 includes a hardware configuration similar to that of a normal computer. More specifically, the controller 220 includes an input and output device 221, a storage device 222, and a processor 223.

The input and output device 221 is an interface for implementing transmission and reception of information between the controller 220 and an outside (the ECU 100 and the wave transmitter-receiver 210 in the example shown in FIG. 2).

The storage device 222 includes a main storage device such as a ROM and a RAM, and an auxiliary storage device such as an HDD or an SSD.

The processor 223 controls various processes to be executed in the controller 220. The processor 223 includes, for example, an arithmetic device such as a CPU. The processor 223 implements various functions by reading and executing a computer program stored in the storage device 222.

Here, the distance detection device 200 according to the embodiment detects a distance to an object by a technique called a so-called time of flight (TOF) method. As to be described in detail below, the TOF method is a technique of calculating a distance to an object in consideration of a difference between a timing at which a transmission wave is transmitted (more specifically, transmission is started) and a timing at which a reception wave is received (more specifically, reception is started).

Figure 3:
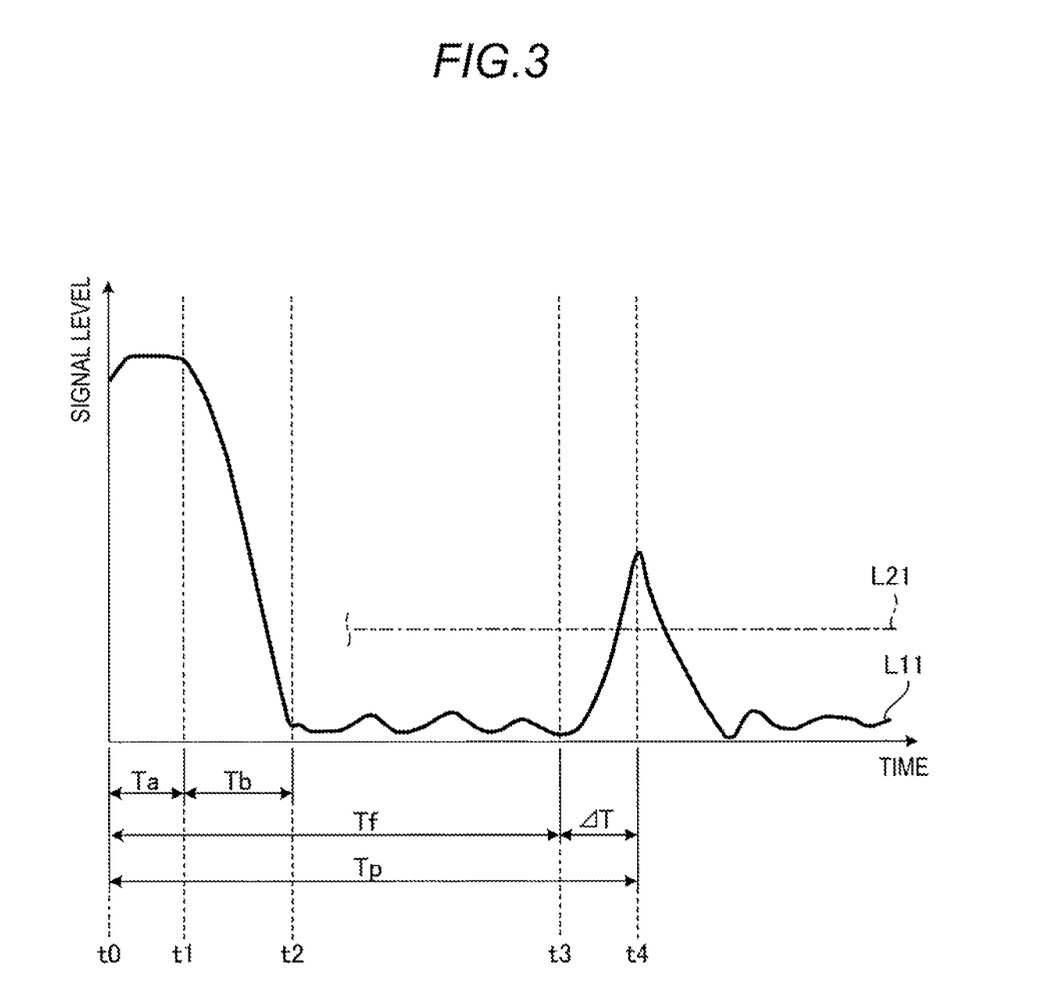
FIG. 3 is an exemplary and schematic diagram for illustrating an outline of a technique to be used by the distance detection device according to the embodiment to detect a distance to an object.

FIG. 3 is an exemplary and schematic diagram for illustrating an outline of the technique to be used by the distance detection device 200 according to the embodiment to detect a distance to an object.

More specifically, FIG. 3 is a diagram exemplarily and schematically showing, in a graph format, a time change of a signal level (for example, amplitude) of an ultrasonic wave transmitted and received by the distance detection device 200 according to the embodiment. In a graph shown in FIG. 3, a horizontal axis corresponds to a time, and a vertical axis corresponds to the signal level of a signal transmitted and received by the distance detection device 200 via the wave transmitter-receiver 210 (vibrator 211).

In the graph shown in FIG. 3, a solid line L11 represents an example of an envelope representing the time change of the signal level of a signal transmitted and received by the distance detection device 200, that is, a degree of vibration of the vibrator 211. It can be seen from the solid line L11 that the vibration of the vibrator 211 due to inertia continues while attenuating during a time Tb until a timing t2 after the transmission of the transmission wave is completed at a timing t1 by the vibrator 211 being driven and vibrated for a time Ta from a timing t0. Therefore, in the graph shown in FIG. 3, the time Tb corresponds to a so-called reverberation time.

The solid line L11 reaches, at a timing t4 at which a time Tp elapses since the timing t0 at which the transmission of the transmission wave is started, a peak at which the degree of vibration of the vibrator 211 exceeds (or is equal to or greater than) a predetermined threshold value Th1 represented by an one-dot chain line L21. The threshold value Th1 is a value set in advance to identify whether the vibration of the vibrator 211 is caused by reception of a reception wave which is a transmission wave reflected and returned by an object to be detected (for example, the obstacle O shown in FIG. 2) or is caused by reception of a reception wave which is a transmission wave reflected and returned by an object not to be detected (for example, the road surface RS shown in FIG. 2).

Although FIG. 3 shows an example in which the threshold value Th1 is set as a constant value that does not change as the time elapses, in the embodiment, the threshold value Th1 may be set as a value that changes as the time elapses.

Here, vibration having the peak exceeding (or equal to or greater than) the threshold value Th1 can be regarded as being caused by the reception of the reception wave which is the transmission wave reflected and returned by the object to be detected. On the other hand, vibration having a peak equal to or less than (or less than) the threshold value Th1 can be regarded as being caused by the reception of the reception wave which is the transmission wave reflected and returned by the object not to be detected.

Therefore, it can be seen from the solid line L11 that the vibration of the vibrator 211 at the timing t4 is caused by the reception of the reception wave which is the transmission wave reflected and returned by the object to be detected.

In the solid line L11, the vibration of the vibrator 211 is attenuated after the timing t4. Therefore, the timing t4 corresponds to a timing at which the reception of the reception wave which is the transmission wave reflected and returned by the object to be detected is completed, in other words, a timing at which the transmission wave transmitted last at the timing t1 is returned as the reception wave.

In addition, in the solid line L11, a timing t3 as a start point of the peak at the timing t4 corresponds to a timing at which the reception of the reception wave which is the transmission wave reflected and returned by the object to be detected is started, in other words, a timing at which the transmission wave transmitted first at the timing t0 is returned as the reception wave. Therefore, in the solid line L11, a time $\Delta T$ between the timing t3 and the timing t4 is equal to the time Ta as a transmission time of the transmission wave.

Based on the above, in order to obtain the distance to an object to be detected by the TOF method, it is necessary to obtain a time Tf between the timing t0 at which the transmission wave starts to be transmitted and the timing t3 at which the reception wave starts to be received. The time Tf can be obtained by subtracting the time $\Delta T$ equal to the time Ta which is the transmission time of the transmission wave from the time Tp which is a difference between the timing t0 and the timing t4 at which the signal level of the reception wave reaches the peak exceeding the threshold value Th1.

The timing t0 at which the transmission wave starts to be transmitted can be easily specified as a timing at which the distance detection device 200 starts to operate, and the time Ta as the transmission time of the transmission wave is determined in advance by setting or the like. Therefore, in order to obtain the distance to an object to be detected by the TOF method, it is important to specify the timing t4 at which the signal level of the reception wave reaches the peak exceeding the threshold value Th1. Further, in order to specify the timing t4, it is important to accurately detect a correspondence relationship between the transmission wave and the reception wave which is the transmission wave reflected and returned by the object to be detected.

In the case of detecting information related to an object using the technique as described above, according to the idea of the related art, a certain period of time required for a transmission wave to return in response to reflection on an object is required between a timing at which transmission of a transmission wave is completed and a timing at which reception of a reception wave is started. Therefore, according to the idea of the related art, when the detection of information related to an object is continuously executed a plurality of times, for example, as in a comparative example shown in FIG. 4, it is necessary to repeatedly execute a series of processes in which a reception wave is received after waiting for a certain period of time after a transmission wave is transmitted.

Figure 4:
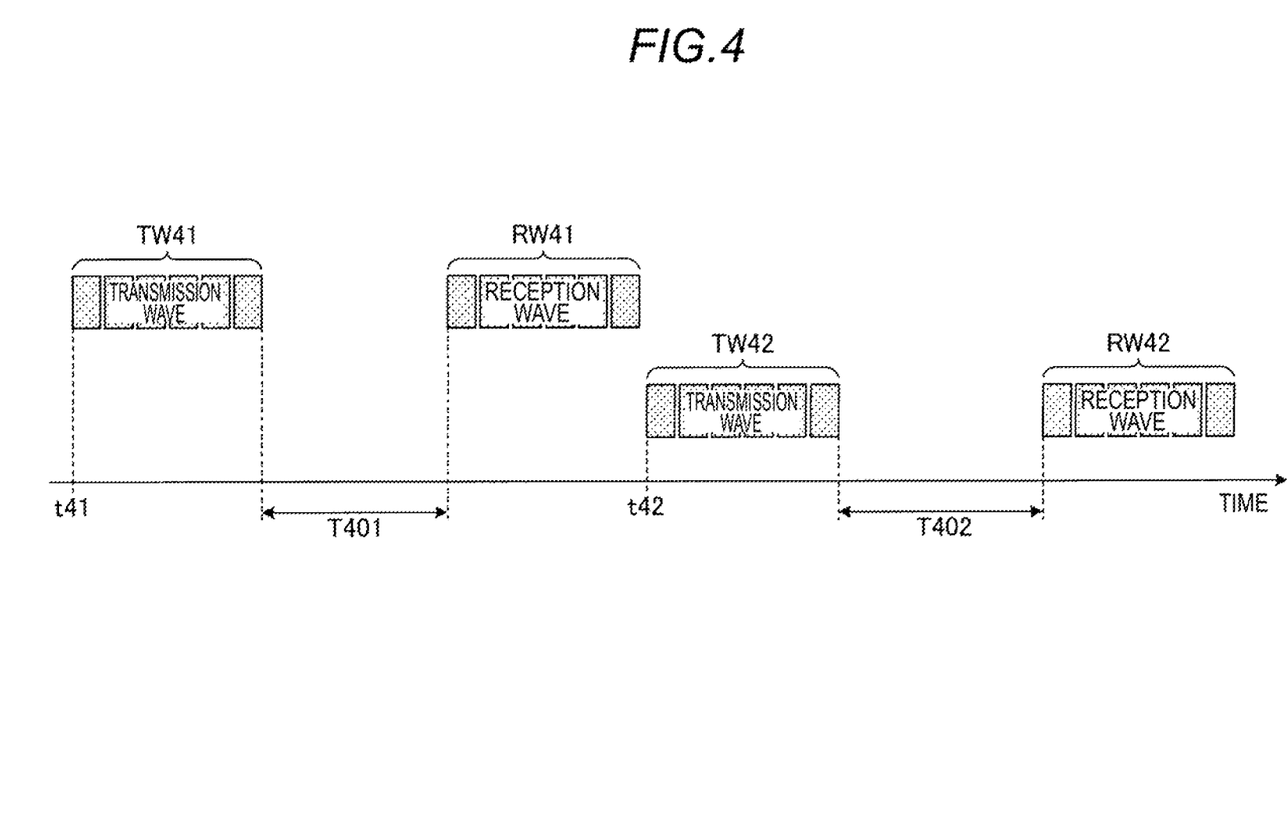
FIG. 4 is an exemplary and schematic diagram showing an example of timings of transmission and reception of a transmission wave and a reception wave according to a comparative example.

FIG. 4 is an exemplary and schematic diagram showing an example of timings of transmission and reception of a transmission wave and a reception wave according to a comparative example.

As shown in FIG. 4, in the comparative example, the transmission and reception of a transmission wave and a reception wave are executed twice based on the idea of the related art. More specifically, in the comparative example, first, transmission of a transmission wave TW41 is started at a timing t41, and after waiting for a predetermined time T401 after the transmission of the transmission wave TW41 is completed, reception of a reception wave RW41 corresponding to the transmission wave TW41 is started. Then, in the comparative example, transmission of a next transmission wave TW42 is started at a timing t42 after the reception of the reception wave RW41 is completed, and reception of a reception wave RW42 corresponding to the transmission wave TW42 is started after waiting for a predetermined time T402 after the transmission of the transmission wave TW42 is completed.

As described above, according to the idea of the related art, since the waiting time required to complete the transmission and reception of all transmission waves and reception waves increases, a time required to complete the process of continuously executing a detection of information related to an object a plurality of times tends to be long. However, it is desirable to execute such a process in a shorter time.

Therefore, in the embodiment, by configuring the distance detection device 200 as follows, the process of continuously executing detection of information related to an object a plurality of times is implemented in a shorter time.

Figure 5:
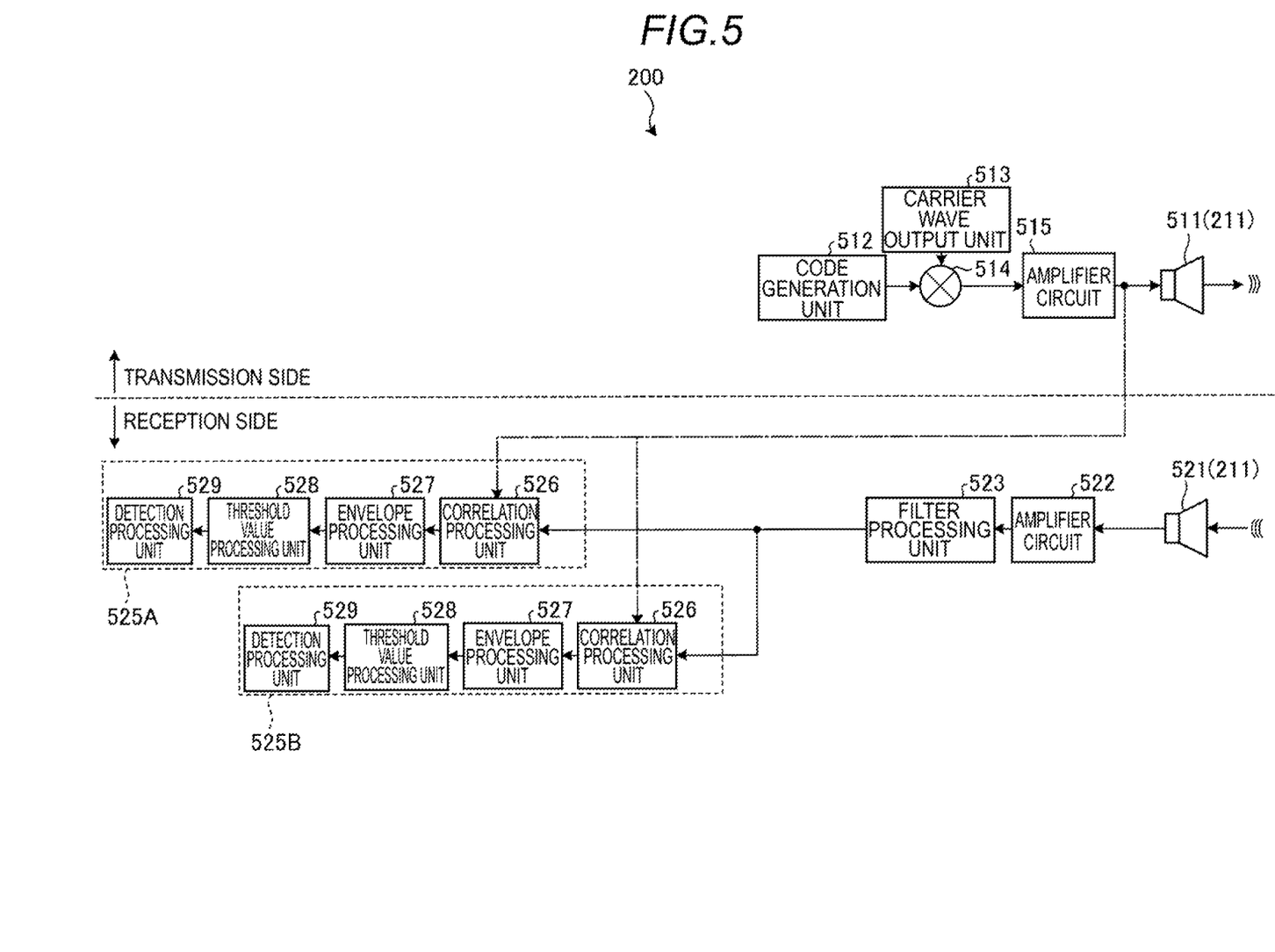
FIG. 5 is an exemplary and schematic block diagram showing a detailed configuration of the distance detection device according to the embodiment.

FIG. 5 is an exemplary and schematic block diagram showing a detailed configuration of the distance detection device 200 according to the embodiment.

In FIG. 5, the configuration on the transmission side and the configuration on the reception side are shown in a separated state, but such an aspect shown in the drawings is merely for convenience of description. Therefore, in the embodiment, as described above, both the transmission of a transmission wave and the reception of a reception wave are implemented by the single wave transmitter-receiver 210. It is noted that, as described above, the technique of the embodiment is also applicable to a configuration in which the configuration on the transmission side and the configuration on the reception side are separated from each other.

In the embodiment, at least a part of the configuration shown in FIG. 5 is implemented as a result of cooperation between hardware and software, more specifically, as a result of the processor 223 of the distance detection device 200 reading and executing a computer program from the storage device 222. It is noted that, in the embodiment, at least a part of the configuration shown in FIG. 5 may be implemented by dedicated hardware (circuitry).

In the embodiment, each configuration shown in FIG. 5 may operate under control of the controller 220 of the distance detection device 200, or may operate under control of the external ECU 100.

First, the configuration on the transmission side of the distance detection device 200 will be described.

As shown in FIG. 5, the distance detection device 200 includes, as the configuration on the transmission side, a wave transmitter 511, a code generation unit 512, a carrier wave output unit 513, a multiplier 514, and an amplifier circuit 515. The wave transmitter 511 is an example of a "transmission unit".

The wave transmitter 511 is configured with the vibrator 211 described above, and the vibrator 211 transmits a transmission wave corresponding to a transmission signal output (amplified) from the amplifier circuit 515.

Here, in the embodiment, the code generation unit 512, the carrier wave output unit 513, the multiplier 514, and the amplifier circuit 515 function as a transmission processing unit that sequentially transmits, using the wave transmitter

511, a plurality of transmission waves to which identification information different from each other is applied. Hereinafter, as an example, an example in which the transmission processing unit transmits two transmission waves including a first transmission wave and a second transmission wave as the plurality of transmission waves will be described.

For example, the code generation unit 512 generates two types of signals (pulse signals) corresponding to codes of a bit string including consecutive 0 or 1 bit so as to correspond to the first transmission wave and the second transmission wave, respectively. A length of the bit string corresponds to a code length of the identification information applied to the transmission signal. For example, the code length is set to such a length that two types of transmission waves transmitted from the four distance detection devices 200 shown in FIG. 1 can be distinguished from each other.

The carrier wave output unit 513 outputs a carrier wave as a signal to which identification information is to be applied.

The multiplier 514 modulates the carrier wave so as to apply the identification information by multiplying an output from the code generation unit 512 and an output from the carrier wave output unit 513. Then, the multiplier 514 outputs the modulated carrier wave to which the identification information is applied to the amplifier circuit 515 as a transmission signal that is a source of the transmission wave. In the embodiment, as a modulation method, for example, a single modulation method or a combination of two or more modulation methods that are generally well known, such as an amplitude modulation method or a phase modulation method, may be used.

The amplifier circuit 515 amplifies the transmission signal output from the multiplier 514 and outputs the amplified transmission signal to the wave transmitter 511.

With such a configuration, in the embodiment, the code generation unit 512, the carrier wave output unit 513, the multiplier 514, and the amplifier circuit 515 sequentially transmit, by using the wave transmitter 511, the first transmission wave to which first identification information is applied and the second transmission wave to which second identification information is applied. Since transmission timings of the first transmission wave and the second transmission wave will be described in detail later, further description thereof will be omitted here.

Next, the configuration on the reception side of the distance detection device 200 will be described.

As shown in FIG. 5, the distance detection device 200 includes, as the configuration on the reception side, a wave receiver 521, an amplifier circuit 522, a filter processing unit 523, and a plurality of (two in FIG. 5) signal processing systems 525A and 525B. The wave receiver 521 is an example of a "reception unit".

The wave receiver 521 is configured with the vibrator 211 described above, and the vibrator 211 receives, as a reception wave, a transmission wave reflected by an object.

As described above, in the embodiment, the two transmission waves including the first transmission wave and the second transmission wave are transmitted. Therefore, the wave receiver 521 receives two reception waves including a first reception wave corresponding to the first transmission wave and a second reception wave corresponding to the second transmission wave.

Figure 6:
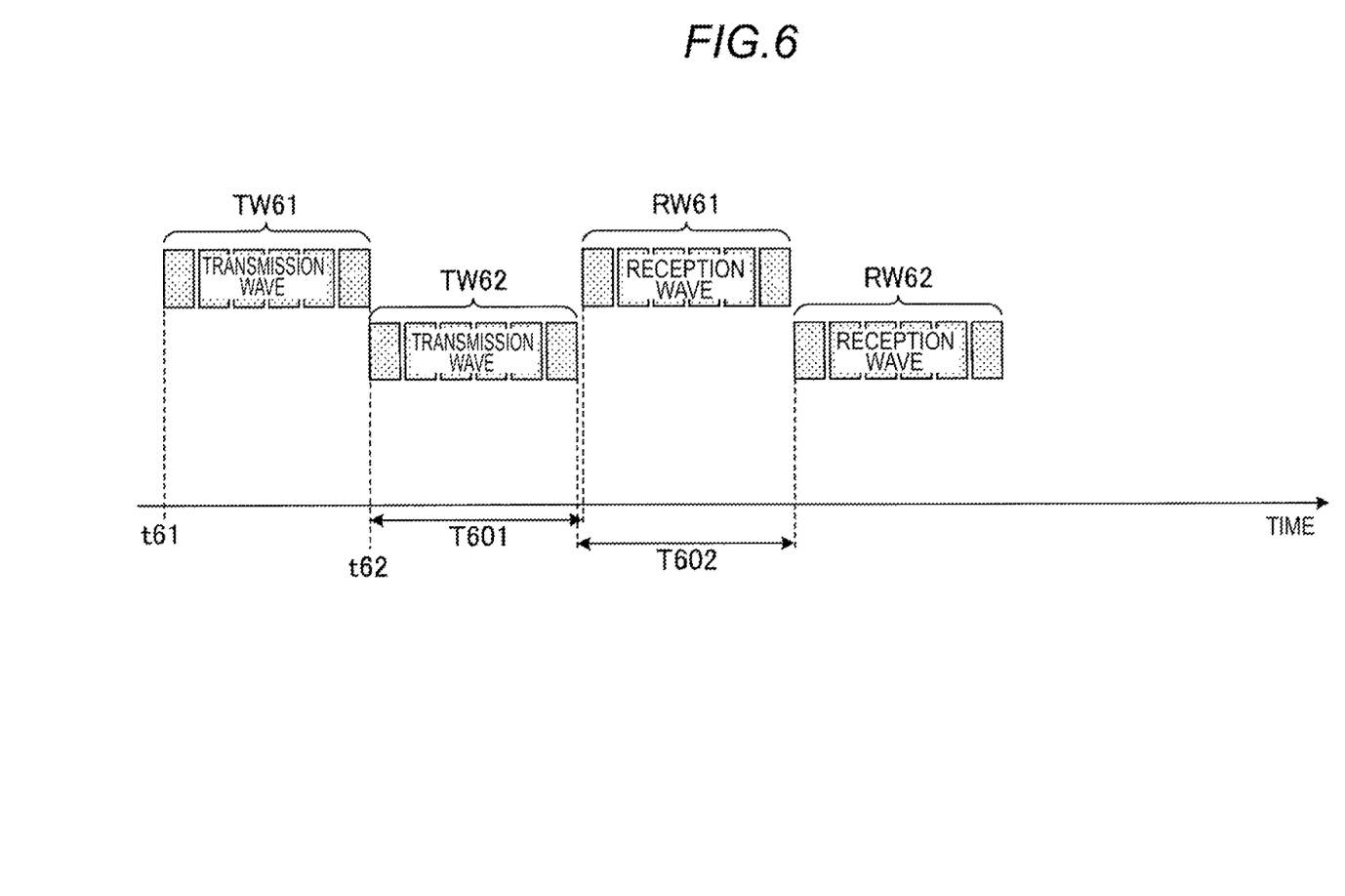
FIG. 6 is an exemplary and schematic diagram showing an example of timings of transmission and reception of a transmission wave and a reception wave according to the embodiment.

Here, in the embodiment, the transmission of the two transmission waves (the first transmission wave and the second transmission wave) and the reception of the two reception waves (the first reception wave and the second reception wave) are executed at timings shown in FIG. 6.

FIG. 6 is an exemplary and schematic diagram showing an example of timings of the transmission and reception of a transmission wave and a reception wave according to the embodiment.

As shown in FIG. 6, in the embodiment, first, transmission of a transmission wave TW61 as the first transmission wave is started at a timing t61. Then, at a timing t62 corresponding to completion of the transmission of the transmission wave TW61, transmission of a transmission wave TW62 as the second transmission wave is started.

Then, when the transmission of the transmission wave TW62 is completed and a predetermined time T601 elapses since the transmission of the transmission wave TW61 is completed, reception of a reception wave RW61 as the first reception wave corresponding to the transmission wave TW61 is started. Then, when the reception of the reception wave RW61 is completed and a predetermined time T602 elapses since the transmission of the transmission wave TW62 is completed, reception of a reception wave RW62 as the second reception wave corresponding to the transmission wave TW62 is started.

As described above, in the embodiment, a waiting time between the transmission of the first transmission wave and the reception of the first reception wave is used for the transmission of the second transmission wave. Then, a waiting time between the transmission of the second transmission wave and the reception of the second reception wave is used for the reception of the first reception wave. Therefore, according to the embodiment, continuous transmission and reception of a plurality of transmission waves and a plurality of reception waves can be executed in a shorter time (more efficiently).

Referring back to FIG. 5, the amplifier circuit 522 amplifies a reception signal which is a signal corresponding to the reception wave received via the wave receiver 521. The reception wave received via the wave receiver 521 is any one of the first reception wave and the second reception wave according to the timing.

The filter processing unit 523 performs filtering processing on the reception signal amplified by the amplifier circuit 522. The filtering processing includes reduction of noise, correction of Doppler shift, and the like.

The amplifier circuit 522 and the filter processing unit 523 function as a reception processing unit that receives a reception wave using the wave receiver 521. A reception signal based on the reception wave received by using the wave receiver 521 is transmitted to the signal processing systems 525A and 525B.

Each of the signal processing systems 525A and 525B includes a correlation processing unit 526, an envelope processing unit 527, a threshold value processing unit 528, and a detection processing unit 529. Based on these configurations, the signal processing systems 525A and 525B achieve a function of specifying a relationship between the reception wave received via the wave receiver 521 and a transmission wave transmitted via the wave transmitter 511, and a function of detecting information related to an object based on the specified relationship.

The correlation processing unit 526 acquires a correlation value corresponding to a degree of similarity of the identification information between the transmission wave and the reception wave based on the transmission signal acquired from the configuration on the transmission side and the reception signal filter-processed by the filter processing unit 523. The correlation value is calculated based on a generally well-known correlation function or the like.

Then, the envelope processing unit 527 obtains an envelope of a signal waveform corresponding to the correlation value acquired by the correlation processing unit 526.

Then, the threshold value processing unit 528 compares the value of the envelope obtained by the envelope processing unit 527 with a predetermined threshold value, and determines whether the identification information of the transmission wave and the identification information of the reception wave is similar to each other at a predetermined level or more based on a comparison result.

Then, based on a processing result by the threshold value processing unit 528, the detection processing unit 529 detects the distance to an object by the TOF method by specifying a timing at which the degree of similarity of the identification information between the transmission wave and the reception wave has a predetermined level or more, that is, a timing (for example, the timing t4 shown in FIG. 3) at which the signal level of the reception wave which is the transmission wave returned due to reflection reaches a peak exceeding the threshold value.

Here, in the embodiment, the correlation processing unit 526 of the signal processing system 525A is configured to acquire the correlation value by using the transmission signal corresponding to the first transmission wave, and the correlation processing unit 526 of the signal processing system 525B is configured to acquire the correlation value by using the transmission signal corresponding to the second transmission wave. Therefore, the correlation value acquired by the correlation processing unit 526 of the signal processing system 525A is a value reflecting similarity to the first transmission wave, and the correlation value acquired by the correlation processing unit 526 of the signal processing system 525B is a value reflecting similarity to the second transmission wave.

Therefore, in the embodiment, the detection processing unit 529 of the signal processing system 525A specifies a timing at which the signal level of the first reception wave which is the first transmission wave returned due to reflection reaches the peak exceeding the threshold value, and the detection processing unit 529 of the signal processing system 525B specifies a timing at which the signal level of the second reception wave which is the second transmission wave returned due to reflection reaches the peak exceeding the threshold value. Accordingly, continuous detection of information related to an object can be implemented based on continuous transmission and reception of two transmission waves and two reception waves corresponding to the two transmission waves.

Figure 7:
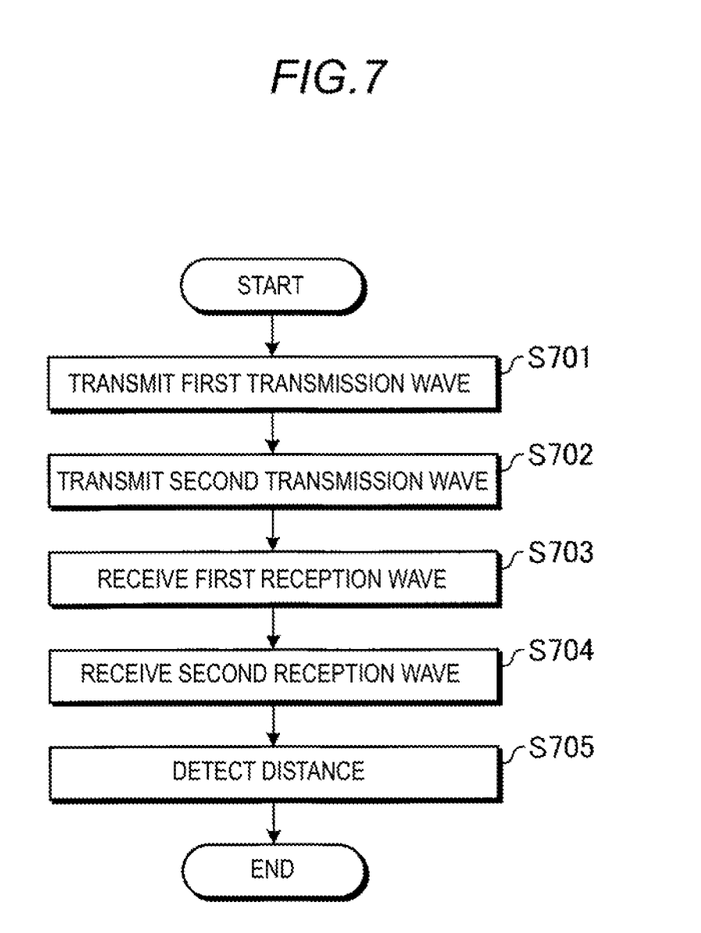
FIG. 7 is an exemplary flowchart showing a flow of a process to be executed by the distance detection device according to the embodiment.

Based on the above configuration, the distance detection device 200 according to the embodiment detects the information related to an object by executing a process in a flow as shown in FIG. 7.

FIG. 7 is an exemplary flowchart showing a flow of the process to be executed by the distance detection device 200 according to the embodiment.

As shown in FIG. 7, in the embodiment, first, in S701, the distance detection device 200 uses the wave transmitter 511 to transmit the first transmission wave to which predetermined identification information is applied.

Then, in S702, in response to completion of the transmission of the first transmission wave in S701, the distance detection device 200 uses the wave transmitter 511 to transmit the second transmission wave to which identification information different from that of the first transmission wave is applied.

Then, in S703, in response to completion of the transmission of the second transmission wave in S702, the distance detection device 200 uses the wave receiver 521 to receive the first reception wave which is the first transmission wave returned due to reflection by the object.

Then, in S704, in response to completion of the reception of the first reception wave in S703, the distance detection device 200 uses the wave receiver 521 to receive the second reception wave which is the second transmission wave returned due to reflection by the object.

Then, in S705, the distance detection device 200 detects the distance to the object based on the relationship between the first transmission wave transmitted in S701 and the first reception wave received in S703, and detects the distance to the object based on the relationship between the second transmission wave transmitted in S702 and the second reception wave received in S704. Then, the process ends.

For convenience of explanation, FIG. 7 shows an example in which the distance is detected in response to the completion of both the reception of the first reception wave and the reception of the second reception wave, but in the embodiment, the detection of the distance based on the relationship between the first transmission wave and the first reception wave may be promptly executed after the reception of the first reception wave is completed regardless of whether the reception of the second reception wave is completed.

As described above, the object detection system according to the embodiment includes the wave transmitter 511, the wave receiver 521, and the detection processing unit 529. The wave transmitter 511 sequentially transmits a plurality of transmission waves to which identification information different from one another is applied. The wave receiver 521 sequentially receive a plurality of reception waves respectively corresponding to the plurality of transmission waves returned in response to reflection by an object after all the plurality of transmission waves are transmitted by the wave transmitter 511. The detection processing unit 529 detects information related to the object based on the relationship between the plurality of transmission waves and the plurality of reception waves.

According to the configuration as described above, since transmission of the plurality of transmission waves is collectively executed, and then reception of the plurality of reception waves is collectively executed, the time required to complete transmission and reception of all the transmission waves and the reception waves can be shortened compared to a case where a series of processes of receiving one reception wave after waiting for a certain period of time after transmitting one transmission wave is repeatedly executed a plurality of times. Therefore, the process of continuously executing a detection of information related to an object a plurality of times can be executed in a shorter time.

The plurality of transmission waves are the first transmission wave and the second transmission wave different from the first transmission wave, and the plurality of reception waves are the first reception wave corresponding to the first transmission wave and the second reception wave corresponding to the second transmission wave. In this case, the wave transmitter 511 transmits the first transmission wave, and then transmits the second transmission wave before the first reception wave is received by the wave receiver 521, and the wave receiver 521 receives the first reception wave after the second transmission wave is transmitted by the wave transmitter 511, and then receives the second reception wave. According to such a configuration, transmission and reception of two transmission waves and two reception waves can be executed efficiently (in a shorter time).

In the embodiment, the detection processing unit 529 detects the distance to the object as the information related to the object based on the difference between the timing at which each of the plurality of transmission waves is transmitted and the timing at which each of the plurality of reception waves is received. According to such a configuration, the distance to the object can be easily detected.

In the embodiment, the wave transmitter 511 and the wave receiver 521 are integrally mounted on the distance detection device 200, which is an in-vehicle sonar, as the wave transmitter-receiver 210 including the single vibrator 211 capable of transmitting and receiving a sound wave, and the detection processing unit 529 is also mounted on the distance detection device 200. According to such a configuration, the distance detection device 200 alone can achieve an effect that the process of continuously executing detection of information related to an object a plurality of times can be executed in a shorter time.

In the embodiment, a plurality of distance detection devices 200 as the in-vehicle sonars are provided. Then, the wave transmitter-receiver 210 transmits and receives the plurality of transmission waves and the plurality of reception waves to which identification information different by the distance detection device 200 is applied. According to such a configuration, the transmission and reception of the plurality of transmission waves and the plurality of reception waves can be flexibly executed in various modes, for example, transmission and reception of a plurality of transmission waves and a plurality of reception waves can be simultaneously executed in the plurality of distance detection devices 200.

Modification

In the embodiments described above, the technique disclosed here is applied to a configuration in which information related to an object is detected by transmission and reception of ultrasonic waves, but the technique disclosed here can also be applied to a configuration in which information related to an object is detected by transmission and reception of another wave such as a sound wave, a millimeter wave, an electromagnetic wave, or the like as a wave other than the ultrasonic wave.

In the embodiment described above, the distance detection device that detects a distance to an object is shown as a target to which the technique of the present disclosure is applied, but the technique of the present disclosure is also applicable to an object detection device that detects only a presence or absence of an object as information related to the object.

In the embodiment described above, a configuration in which the detection processing unit that detects the information related to the object is mounted on the object detection device which is the in-vehicle sonar is shown, but the detection processing unit may be mounted on an in-vehicle control device that controls the in-vehicle sonar. According to such a configuration, the in-vehicle sonar together with the in-vehicle control device can achieve the effect that the process of continuously executing detection of information related to an object a plurality of times can be executed in a shorter time.

In the embodiment described above, for simplification, only a configuration in which two transmission waves and two reception waves corresponding to the two transmission waves are continuously transmitted and received is specifically shown. However, the technique of the present disclosure is also applicable to a configuration in which three or more transmission waves and three or more reception waves corresponding to the three or more transmission waves are continuously transmitted and received. In this configuration, the reception of the reception wave is also started after the transmission of all the transmission waves is completed according to the technical idea similar to that of the embodiment described above.

An object detection system as an example of the present disclosure includes: a transmission unit configured to sequentially transmit a plurality of transmission waves to which identification information different from one another is applied; a reception unit configured to sequentially receive a plurality of reception waves respectively corresponding to the plurality of transmission waves returned in response to reflection by an object after all the plurality of transmission waves are transmitted by the transmission unit; and a detection processing unit configured to detect information related to the object based on a relationship between the plurality of transmission waves and the plurality of reception waves.

According to the object detection system described above, since transmission of the plurality of transmission waves is collectively executed, and then reception of the plurality of reception waves is collectively executed, a time required to complete transmission and reception of all the transmission waves and the reception waves can be shortened compared to a case where a series of processes of receiving one reception wave after waiting for a certain period of time after one transmission wave is transmitted is repeatedly executed a plurality of times. Therefore, the process of continuously executing detection of information related to an object a plurality of times can be executed in a shorter time.

In the object detection system described above, when the plurality of transmission waves include a first transmission wave and a second transmission wave different from the first transmission wave, and the plurality of reception waves include a first reception wave corresponding to the first transmission wave and a second reception wave corresponding to the second transmission wave, the transmission unit may be configured to transmit the first transmission wave, and then transmit the second transmission wave before the first reception wave is received by the reception unit, and the reception unit may be configured to receive the first reception wave after the second transmission wave is transmitted by the transmission unit, and then receives the second reception wave. According to such a configuration, transmission and reception of two transmission waves and two reception waves can be executed efficiently (in a shorter time).

In the object detection system described above, the detection processing unit may be configured to detect a distance to the object as the information related to the object based on a difference between a timing at which each of the plurality of transmission waves is transmitted and a timing at which each of the plurality of reception waves is received. According to such a configuration, the distance to the object can be easily detected.

In the object detection system described above, the transmission unit and the reception unit may be integrally mounted on an in-vehicle sonar as a transmission and reception unit including a single vibrator that transmits and receives a sound wave, and the detection processing unit may be mounted on the in-vehicle sonar. According to such a configuration, the in-vehicle sonar alone can achieve an effect that the process of continuously executing detection of information related to an object a plurality of times can be executed in a shorter time.

In the object detection system described above, the transmission unit and the reception unit may be integrally mounted on an in-vehicle sonar as a transmission and reception unit including a single vibrator that transmits and receives a sound wave, and the detection processing unit may be mounted on an in-vehicle control device that controls the in-vehicle sonar. According to such a configuration, the in-vehicle sonar together with the in-vehicle control device can achieve the effect that the process of continuously executing detection of information related to an object a plurality of times can be executed in a shorter time.

In the object detection system described above, a plurality of the in-vehicle sonars may be provided, and the transmission and reception unit may be configured to transmit and receive the plurality of transmission waves and the plurality of reception waves to which identification information different by the in-vehicle sonars is applied. According to such a configuration, the transmission and reception of a plurality of transmission waves and a plurality of reception waves can be flexibly executed in various modes, for example, the transmission and reception of a plurality of transmission waves and a plurality of reception waves can be simultaneously executed in a plurality of in-vehicle sonars.

Although the embodiment and modification disclosed here have been described, these embodiment and modification have been presented byway of example only, and are not intended to limit the scope of the disclosure. The novel embodiment and modification described herein may be carried out in a variety of forms, and various omissions, substitutions and changes may be made without departing from the spirit of the disclosure. The above-described embodiment and modification are contained in the scope and gist of this disclosure, and are contained in the disclosure described in the claims and the equivalent scope thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An object detection system, comprising:
    a transmission unit configured to sequentially transmit a plurality of transmission waves, the plurality of transmission waves include a first transmission wave and a second transmission wave different from the first transmission wave, the first transmission wave having identification information different from the second transmission wave;
    a reception unit configured to sequentially receive a plurality of reception waves respectively corresponding to the first transmission wave and the second transmission wave returned in response to reflection by an object after the first transmission wave and the second transmission wave are transmitted by the transmission unit; and
    a detection processing unit configured to detect information related to the object based on a relationship between the plurality of transmission waves and the plurality of reception waves.

2. The object detection system according to claim 1, wherein
    the plurality of reception waves include a first reception wave corresponding to the first transmission wave and a second reception wave corresponding to the second transmission wave,
    the transmission unit is configured to transmit the first transmission wave, and then transmit the second transmission wave before the first reception wave is received by the reception unit, and
    the reception unit is configured to receive the first reception wave after the second transmission wave is transmitted by the transmission unit, and then receives the second reception wave.

3. The object detection system according to claim 1, wherein
    the detection processing unit is configured to detect a distance to the object as the information related to the object based on a difference between a timing at which each of the plurality of transmission waves is transmitted and a timing at which each of the plurality of reception waves is received.

4. The object detection system according to claim 1, wherein
    the transmission unit and the reception unit are integrally mounted on an in-vehicle sonar as a transmission and reception unit including a single vibrator that transmits and receives a sound wave, and
    the detection processing unit is mounted on the in-vehicle sonar.

5. The object detection system according to claim 1, wherein
    the transmission unit and the reception unit are integrally mounted on an in-vehicle sonar as a transmission and reception unit including a single vibrator that transmits and receives a sound wave, and
    the detection processing unit is mounted on an in-vehicle control device that controls the in-vehicle sonar.

6. The object detection system according to claim 4, wherein
    a plurality of the in-vehicle sonars are provided, and
    the transmission and reception unit is configured to transmit and receive the plurality of transmission waves and the plurality of reception waves to which identification information different by the in-vehicle sonars is applied.

7. The object detection system according to claim 5, wherein
    a plurality of the in-vehicle sonars are provided, and
    the transmission and reception unit is configured to transmit and receive the plurality of transmission waves and the plurality of reception waves to which identification information different by the in-vehicle sonars is applied.

* * * * *